US006940995B2

(12) United States Patent
Choi et al.

(10) Patent No.: US 6,940,995 B2
(45) Date of Patent: Sep. 6, 2005

(54) METHOD FOR EMBEDDING AND EXTRACTING TEXT INTO/FROM ELECTRONIC DOCUMENTS

(75) Inventors: Jong Uk Choi, Seoul (KR); Gi Chul Choi, Seoul (KR)

(73) Assignee: Markany, Inc., Seoul (KR)

( * ) Notice: Subject to any disclaimer, the term of this patent is extended or adjusted under 35 U.S.C. 154(b) by 208 days.

(21) Appl. No.: 10/169,210

(22) PCT Filed: Nov. 2, 2001

(86) PCT No.: PCT/KR01/01862

§ 371 (c)(1),
(2), (4) Date: Oct. 17, 2002

(87) PCT Pub. No.: WO02/37309

PCT Pub. Date: May 10, 2002

(65) Prior Publication Data

US 2003/0099374 A1 May 29, 2003

(51) Int. Cl.[7] ............................................... H04K 1/00
(52) U.S. Cl. ......................................... 382/100; 283/72
(58) Field of Search ................................ 382/100, 232; 358/3.28; 713/176; 380/252, 287, 51, 54; 283/72, 74, 75, 77, 85, 93, 113, 901

(56) References Cited

U.S. PATENT DOCUMENTS

2003/0035564 A1 * 2/2003 Honsinger et al. .......... 382/100

FOREIGN PATENT DOCUMENTS

WO    WO 00/31675 A2 * 6/2000 ............ G06K/9/00

OTHER PUBLICATIONS

Herrigel et al., "An Optical/Digital Identification/Verification System based on Digital Watermarking Technology," *Proc. SPIE vol. 4148: Optoelectronic and Hybrid Optical/Digital Systems for Image/Signal Processing*, Sep. 1999, pp. 170–176.*

Park et al., "Visible Watermarking using Verfiable Digital Seal Image," *Proc. Symp. on Cryptography and Information Security*, Jan. 2001, pp. 103–108.*

Bern et al., "Trustworthy Paper Documents," *Proc. 4th Int. Workshop on Information Hiding, LNCS* vol. 2137, Apr. 2001, pp. 1–12.*

Sun et al., "An Optical Watermarking Solution for Authenticating Printed Documents," *Proc. Int. Conf. on Information Technology: Coding and Computing*, Apr. 2001, pp. 65–70.*

* cited by examiner

*Primary Examiner*—Andrew W. Johns
(74) *Attorney, Agent, or Firm*—Senniger Powers

(57) ABSTRACT

The present invention relates to a method and apparatus for authenticating various types of digital certificates by using a text embedding method. The execution of the present invention is divided into two case, one case including images in the certificate and another case not including the images in the certificate, according to the characteristics of the certificate. In the former case, a text embedding method is applied to images included in the certificate to embed a series of information text (a specific number of the certificate, and issuing organization, name of a person in charge, etc.) designated by a person who issues the certificate into the images. In the latter case, there is generated an image imperceptible to the human eve but having the same color as the ground color certificate.

12 Claims, 12 Drawing Sheets

CONVERTING AN IMAGE DATA INTO AN ONE DIMENSIONAL DATA

IN CASE OF COLOR IMAGE

IN CASE OF GRAYSCALE IMAGE

IN CASE OF COLOR IMAGE, R-COMPONENT IS CONVERTED INTO ONE DIMENSIONAL DATA, AND THEN G-COMPONENT AND B-COMPONENT IS CONVERTED.

GRAYSCALE IMAGE, COLOR IMAGE, REGISTERED SEAL IMAGES

METHOD FOR EMBEDDING AND EXTRACTING TEXT INTO/FROM ELECTRONIC DOCUMENTS

BACKGROUND OF THE INVENTION

1. Field of the Invention

The present invention relates to a method and apparatus for preventing a certificate from being forged and altered and authenticating the certificate as the original copy based on the feature of the digital certificate. More specifically, the present invention is to issue the certificate after embedding invisibly a text containing a series of information to authenticate the certificate into the digital certificate, and authenticate and confirm the digital certificate by extracting the information text embedded through the method and apparatus suggested in the present invention and confirming the content of the extracted information text.

2. Description of the Related Art

In advance, "embedding" means that not only a first object is physically arranged in a second object but also the content of the second object using a specific algorithm based on the content of the first object is changed so that the content of the first object can be extracted with the algorithm later used and the second object. In particular, in case where the digital certificate includes an image format (logo or seal image representing an issuing authority, etc.), an information text is embedded into the image and in case where the digital certificate does not include an image format, a transparent image is generated to embed an information text. The information text embedded image is inserted in the certificate. Absolutely, there is no change to the naked eye. In other words, the embedded information text is embedded into the image of the certificate or the generated transparent image based on the content which is included in the certificate so as to make visual distinguishing impossible and is employed for authenticating the certificate after the certificate has been issued. The present invention relates to a method and apparatus for embedding the information text into the image which is included in the certificate. In case where an exterior operation is applied to the embedded text, e.g., the digital data processing such as compression, filtering, re-sampling, cropping and the like is processed, it is easily removed and the authentication of the certificate is decided based on whether said information text exists or not. In case where a third party modifies the content of the information text on purpose, the embedded information text is extracted to find out the changed situation by deciding whether the extraction is possible or not and comparing with content of the first embedded text and deciding whether to be identical or not.

At present, as Internet users have sharply increased, trade of products through an electronic commerce has activated. In the trade of products or online/offline transaction, authentication of the digital certificate has been emerging as an important procedure. It is a tendency that process of issuing a certificate including not only such electronic commerce certificates but also various certificates related to civil affair and certificates issued from each school, etc. has been computerized and electronized. However, the reason why it is impossible to issue a certificate as a digital document at present is a forgery and alternation thereof.

The technique for authenticating the digital certificate includes an authentication function application, blank controlling method, bar code method, etc. In the method of applying an authentication function, suppose that both certificate issuer and holder share a common secrete value S. The authentication function includes a secrete key algorithm, message digest and the like wherein the representative function is a hash function. Authentication using the hash function is proceeded as follows: First, an issuer of certificate of authentication calculates the hash value by the certificate, secrete key value S, and hash function and adds the hash value result to the certificate and sends the certificate to a person who requests to issue a certificate. A person who receives a certificate finds the hash value by the session key S that the person already knows and the hash function. The above hash value is compared with the hash value which is sent from the issuer of certificate of authentication. If the two hash values are the same, its authentication is confirmed and if not, the certificate of authentication is regarded as being altered. Comparison of the hash value enables to confirm identity (authentication) of the other party of the transaction and detect whether the certificate is forged or altered.

Such authentication using the authentication function has the following drawbacks:

First, authentication is based on a text document. If a document of different format such as an image or voice mark is embedded into the certificate, it should be separately authenticated or its authentication is impossible.

Second, it can accurately determine if the document data has been modified. However, if modified, it is impossible to restore the original document.

Third, since a signature should be added so as to confirm integrity of the certificate of authentication, the size of the original certificate has been enlarged.

The authentication method using a blank controlling method or letter-form controlling method is based on ASCII code. The ASCII includes 94 picture characters and 34 various characters which are only used for controlling but not printed out. The picture characters include 26 capital characters, 26 small characters, 10 numbers and 32 special characters (%, *, $, etc.). The 34 controlling characters are employed for controlling the destination of data as the standard already designated and arranging texts to be printed out. The controlling character is classified as the following three types of characters, i.e., format effector, information separator, and communication-control character. The format effector controls the layout of print-out and includes familiar controls for a type such as backspace (BS), horizontal tabulation (HT), carriage return (CR). The information separator is used for dividing data into a paragraph or page and includes record separator (RS), file separator (FS), etc. The communication-control character is used for preparing format in which a text message is conveyed through a phone line such as STX (start of text), ETX (End of Text), etc. Most of computers deal with a unit of byte as amount of 8 bits. Hence, ASCII character is mostly stored one by one each byte. The remaining one bit is used for a different purpose if necessary. For example, a printer sets up the highest effective bit as 0 and separates ASCII as 8 bit. The blank controlling method or letter-form controlling method, using such controlling character, controls the blank of the text document of the original certificate to express the information to be embedded or changes the letter-form to express the embedding information. In case where the user's information is embedded on the object of the above code of the document, the drawbacks are as follows:

First, the text document itself of the substantial certificate is changed. The change itself is not shown in the document.

Hence, in case the document is again restored after having been changed, a restoration signal is definitely damaged. That is, it is impossible to perfectly restore the text document.

Second, the region wherein a user can embed the information is small. It can not but embed the information that a user wants in a restricted manner.

Authentication using the bar code method is at present actively applied. The bar code is a code system expressing the information with a pattern of arrangement of black bar and white bar having various widths. Use of bar code makes it possible to deal with office work in an effective, fast, and accurate manner. As its effective value has been admitted in the nation, it is used in various fields of affairs such as office automation, factory automation, etc. around the distribution industry. At present, various ID card employs the bar code. For a student card, the bar code employed therein has a card recognized in a card recognizer when students come in and out the library and a recognition apparatus recognizes the bar code, thereby confirming authenticity of ID cards and identity information. However, such authentication using the bar code has the following drawbacks:

First, the bar code is a code system expressing the information with a pattern of arrangement of black bar and white bar having various widths, thereby making it possible to discriminate it with the eye and thus its alternation is possible.

Second, even though the bar code is scanned many times, failure to read the bar code leads to inputting numbers using a keyboard.

Third, if the bar code is uncertain or is damaged during the distribution, a scanner may read it as wrong numbers.

SUMMARY OF THE INVENTION

The techniques in the prior art have various problems and drawbacks in authenticating the certificate as mentioned above. Such problems lead to the forgery or alternation of the certificate and thus the certificate can be misused on an illegal purpose. Therefore, it is an object of the present invention to provide a method and apparatus for embedding and extracting a text containing some information capable of providing authentication of the certificate using a method different from the existing method in order to firmly provide authentication of the digital certificate (identity certificate of authentication, deposit certificate of confirmation, trade certificate, graduation certificate, degree certificate, cash deal certificate of authentication, commodity receipt, and credit card certificate of authentication, etc.) that is traded online/offline.

It is another object of the present invention is to provide the necessary information hidding. When a transmitter is sending the important information to a receiver, it can be used as a method and apparatus wherein the information text to be sent is embedded to the image-formed data or, the text is transmitted after being manufactured as the image form and the receiver can restore the original information accurately. Such process makes it possible to transmit the information without occurring any warning on a network detector which are generalized over networks or other information detecting mechanism. The information can be securely ensured without encryption process between transmitter and receiver.

The method provided in the present invention for acquiring the above object is to analyze the feature of the existing certificate and authenticate the certificate by applying an information text embedding method appropriate to the feature. The text embedding method for authenticating the digital certificate according to the present invention comprises the steps of classifying the certificate by the certificate analysis, generating the information text according to the classified certificate, bit-streaming the generated text, converting the image data which is included in the certificate into the one dimensional data, and embedding said bit-streamed text data in said one dimensional image data. The step of extracting the embedded text comprises the steps of selecting the text embedded image, extracting the embedded bit-streamed data, and reading the embedded original text information from the extracted bit-stream data. The step of authenticating the certificate includes an apparatus and software for issuing the information text embedded certificate and an apparatus and software for authenticating the text embedded certificate. The apparatus according to the present invention, i.e., a computer, receives commands corresponding to said steps from the recording medium which stores programs corresponding to said steps to perform embedment and extraction of it.

In general, the certificate being issued has two features as follows:

First, an image-formed picture, registered seal or company logo, etc. representing the legal entity who issues the certificate or copyright holder, or confirming the issuer is embedded in the certificate being issued. Such image embedding enables to promote the public trust of the certificate, digitalize the individual information which is included in the certificate and certificate form, etc. and issue the public document to a remote place by the computerization of the issuing procedure.

Second, the certificate being issued uses frequently a specially designated paper in order to approve the issuer or protect the right of the copyright holder or represent the peculiarity of an issuing authority. The special papers include frequently an image representing the issuing authority and are made in an image form or other document file form.

The present invention employs the text embedding method containing the information as a method for authenticating the certificate based on the above features of the digital certificate. Such text embedding technique and method are directed to protection and authentication of the digital certificate and is a new technique discriminated from the existing method of authenticating a certificate. In particular, the text embedding method used in the present invention is a method of embedding the bit-streamed text data and a method and apparatus including the detailed algorithm of an invention are explained referring to the drawings hereinbelow.

For a reference, before explaining the content of the present invention, it is necessary to review images which are included in the certificate, which is to analyze types of the image which are included in the certificate and embed the information appropriate to said image features. The image data contained in the certificate includes a symbolic image representing an issuing place or a registered seal, seal image representing an issuing authority.

DETAILED DESCRIPTION OF THE PREFERRED EMBODIMENTS

Figure 1:
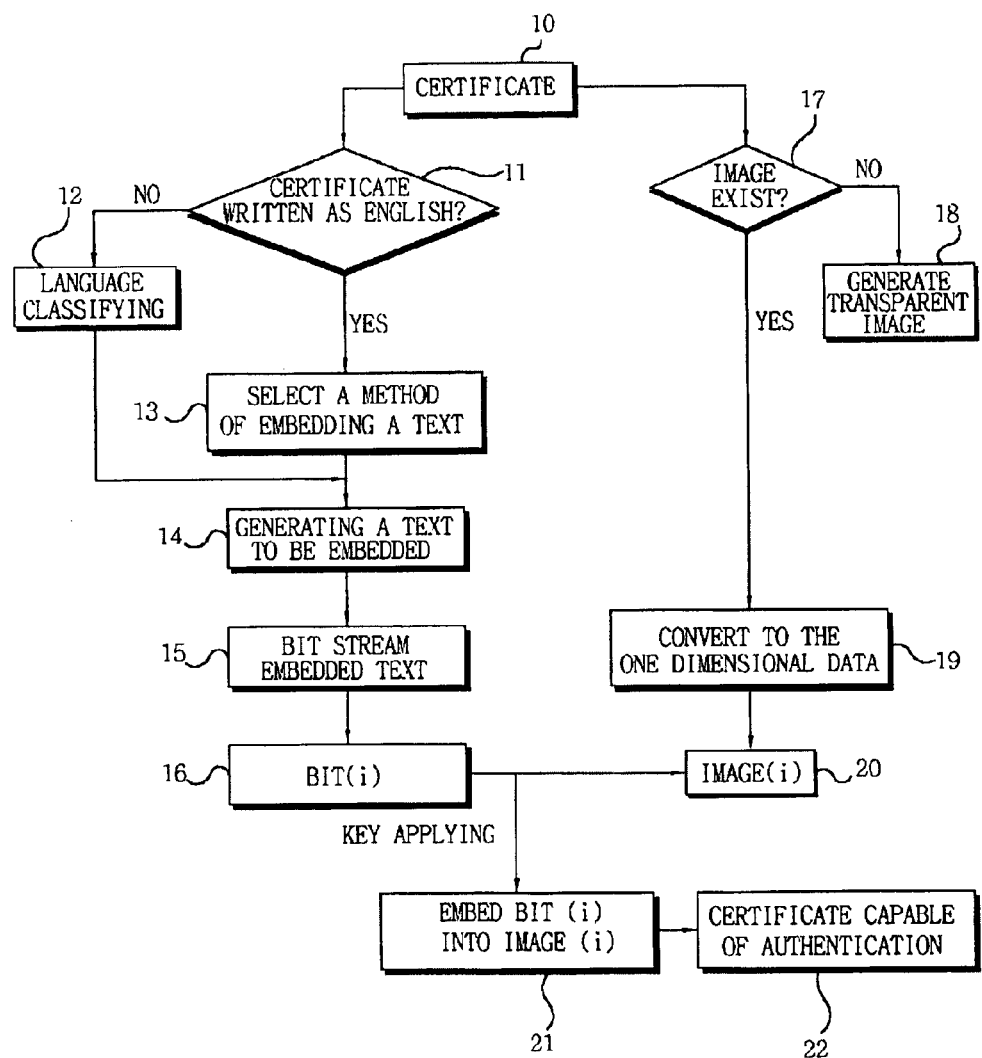
FIG. 1 is a flow chart illustrating conceptually the embedding process of the text embedding apparatus of the present invention.

FIG. 1 is a comprehensive flow chart of the step of embedding a text into the certificate for authenticating the certificate (10) regarding the general flow of the present invention. In the step of classifying the certificate among the steps of FIG. 1, the certificate is classified based on two preconditions of whether an image-formed data exists in the certificate (17) and the certificate is written as English (11). The specific process of classifying the certificate is explained in FIG. 3. In the step (14) of generating the text to be embedded, after proceeding the step of classifying the certificate by a language, in case the certificate is on the basis of English, the step (13) of selecting a method of embedding a text is undergone and in case the certificate is on the basis of other language, the step (12) of selecting a method of embedding a text by the corresponding language is undergone. In case the certificate is on the basis of English, the step of selecting a method is in detail explained in FIG. 4. In case the certificate is on the basis of other language, the process of 15selecting a language is in detail explained in FIG. 5. The generated text is bit streamed as a unit of 6, 7, 8, and 16 bits through the step (15) of bit-streaming. In the step of classifying the certificate, in case image-formed data exists in the certificate, the step (17) of directly converting the image data to the one dimensional data is undergone. In case image-formed data does not exist in the certificate, the step (18) of generating a transparent 20image is undergone. The step of generating a transparent image is in detail explained in FIG. 7. The generated transparent image also undergoes the step (19) of converting a transparent image data to the one dimensional data (20). RSI method, which is applied to the step of converting an image to the one dimensional data, will be in detail explained in FIG. 6. The step (21) of embedding the bit-streamed data in the one dimensional data is proceeded by Equation 4. A key is employed for a secure protection of information in the embedding step.

Figure 2:
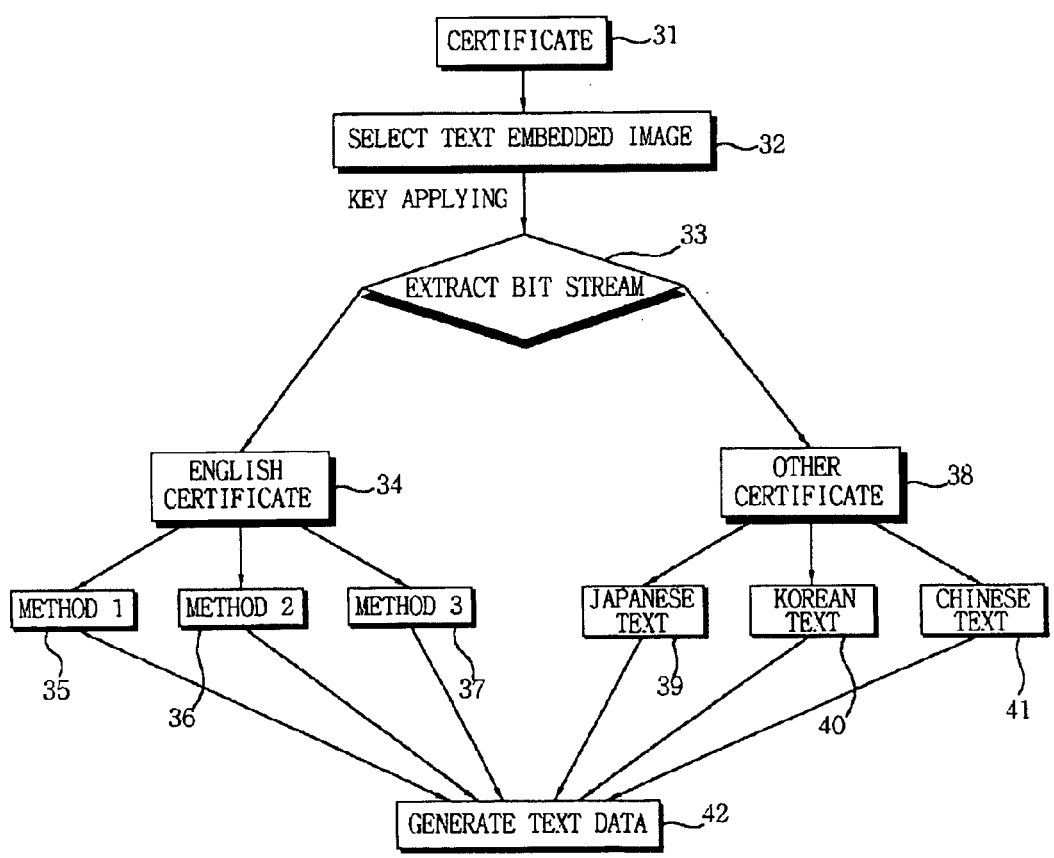
FIG. 2 is a flow chart illustrating conceptually the text extracting process of the present invention.
Figure 4:
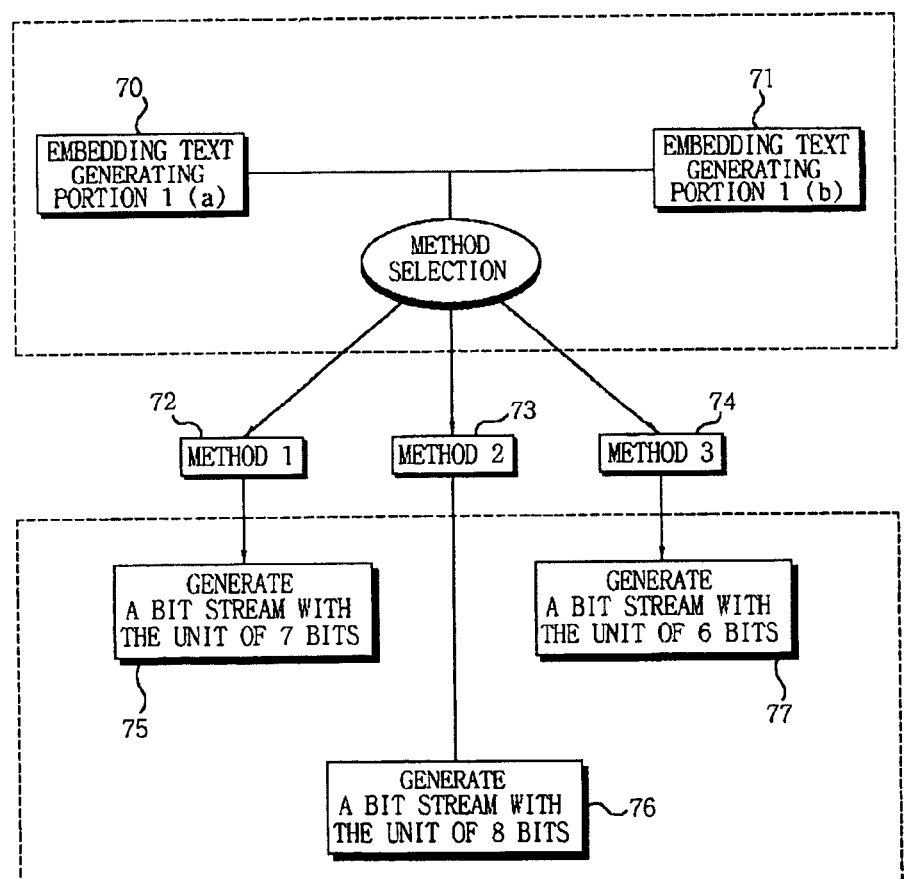
FIG. 4 illustrates the bit streaming process of the text to be embedded with regard to the certificate based on an English text document.
Figure 5:
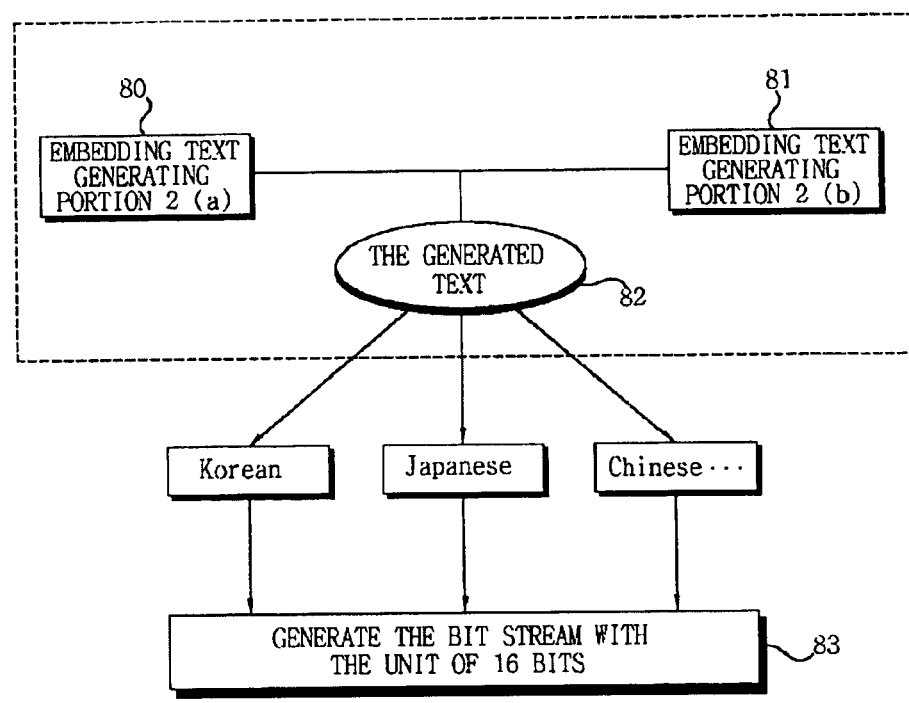
FIG. 5 illustrates the bit streaming process of the text to be embedded in case a certificate is written as a language other than English based on the classification of FIG. 4.

FIG. 2 is a comprehensive flow chart of the step of extracting information text which is a step for authenticating the certificate of the present invention. The step of extracting a text, which is a step of extracting the embedded text, comprises the step (32) of selecting the text embedded image, step (33) of extracting a bit stream, step of constituting a text from the extracted bit stream based on the language of the certificate. The step of selecting an image selects a text embedded image. The embedded image also, includes a transparent image. The bit stream data is extracted by applying a key value employed in first embedding a text from the selected image. Likewise the embedding process, the bit stream data is extracted from, the pixel value information of an image by Equation 4. After determining whether the extracted bit stream data is an English certificate (34) or certificate of other language (38), the text data is generated (42) through a reverse process of selection methods (35~37, 39~41) selected in the step of embedding a text (FIGS. 4 and 5).

The digital certificate has a specified format, and frequently includes image-formed data 52. In the present invention, all cases of a certificate itself is an image, a certificate does not include image-formed data, a certificate does not include image formed data are possible. Because in case a certificate is a image-formed file, the information text is embedded into the certificate image itself, in case an image data exists, the information text is embedded into the image data, and in case an image data does not exist, a transparent image is generated and the information text is embedded into the image and then included in the certificate.

Figure 3:
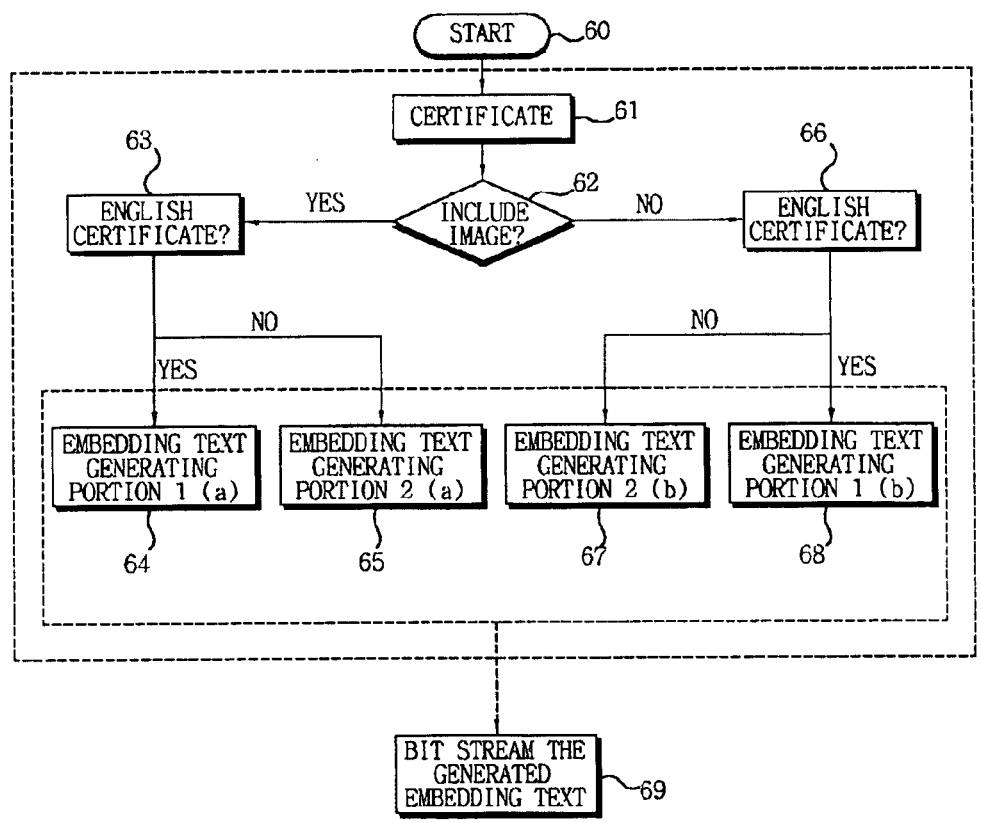
FIG. 3 is a flow chart illustrating the process to the step of generating a text to be embedded according to each feature by classifying certificates based on the feature of the certificate.

FIG. 3 is a drawing of the process of classifying the digital certificate. The classification is based on kinds of language used in the certificate and pattern of the certificate. The certificate is classified on the following two conditions in the step of classifying the certificate.

One is to determine (62) whether an image-formed data is included in the digital certificate (61) and another is to determine (63, 66) whether the certificate is written in English or other language. The above two conditions enable to classify the certificate. If an image-formed file exists, it is determined (63) whether the digital certificate is written in English or other language. It is possible to determine whether "written in English?" based on ASCII code employed and the image separated from the text exists in the form of an object (in case of HTML, it is in the form of a link) in the document. Pursuit of an object makes an automatic determination possible. In case the entire certificate is an image, a text included in the existing certificate is extracted through a character recognition system like a neural network net and automatically classified based on the determination of ASCII code employed. In case the entire certificate is an image, "image included?" automatically determines that an image is included. If in English, a text document to be embedded is written based on the embedding text generating portion 1(a)(64) in FIG. 3. If not in English, a text document to be embedded is generated based on the embedding text generating portion 2(a)(65) in FIG. 3. In case an image-formed data does not exist, a step of preparing a transparent image is further added as compared to the case an image-formed data exists. The process of generating a transparent image will be explained in FIG. 7. After preparing a transparent image, it is determined whether the certificate is written in English or other language. If the certificate is written in English, a text document to be embedded is prepared based on the embedding text generating portion 1(b)(68) in FIG. 3. If not in English, a text document to be embedded is generated by the embedding text generating portion 2(b)(67) in FIG. 3. It is very important to determine whether it is in English or not. The present invention also provides a method of authenticating the digital certificate in Korean, Japanese, and Chinese other than English. And the above method is sure to be applied to the certificate in any other languages.

FIG. 4 shows a bit-streaming process of a text to be embedded regarding the English text document-based certificate. In the step of generating a text to be embedded through a process of classifying the certificate in FIG. 3, a text generated in the embedding text generating portion 1(a)(70) and the embedding text generating portion 1(b)(71) is English text data. (In case of an English certificate, an issuing authority mostly seems to use English as a main language and thus supposes that a text to be embedded is prepared in English.) An information text to be embedded in the English certificate, i.e. 8 bit ASCII code-based text is bit-streamed through the following process: First, there are basically three methods (72~74) in bit streaming and the classification of bit streaming methods is based on table of ASCII code mainly referred to, ASCII code is shown in Table 1.

TABLE 1

| $b_4b_3b_2b_1$ | 000 | 001 | 010 | 011 | 100 | 101 | 110 | 111 |
|---|---|---|---|---|---|---|---|---|
| | | | $b_7b_6b_5$ | | | | | |
| 0000 | NUL | DLE | SP | 0 | @ | P | ` | p |
| 0001 | SOH | DC1 | ! | 1 | A | Q | a | q |
| 0010 | STX | DC2 | " | 2 | B | R | b | r |
| 0011 | ETX | DC3 | # | 3 | C | S | c | s |
| 0100 | EOT | DC4 | $ | 4 | D | T | d | t |
| 0101 | ENQ | NAK | % | 5 | E | U | e | u |
| 0110 | ACK | SYN | & | 6 | F | V | f | v |
| 0111 | BEL | ETB | ' | 7 | G | W | g | w |
| 1000 | BS | CAN | ( | 8 | H | X | h | x |
| 1001 | HT | EM | ) | 9 | I | Y | i | y |
| 1010 | LF | SUB | * | : | J | Z | j | z |
| 1011 | VT | ESC | + | ; | K | [ | k | { |
| 1100 | FF | FS | , | < | L | \ | l | | |
| 1101 | CR | GS | - | = | M | ] | m | } |
| 1110 | SO | RS | . | > | N | | n | ~ |
| 1111 | SI | US | / | ? | O | - | o | DEL |

Method 1 in FIG. 4 is to bit-stream (75) a text document as 7 bits based on Table 1. In case of making binary a text document as 7 bits, 100 English characters constitute a bit stream of 700 bits.

An English code is usually processed as a unit of 1 byte. The remaining one bit differs little by little according to its use. Method 2 adds a parity bit in the form of the remaining even number or odd number to 7 bits of Table 1 and constitutes a 1 byte-formed code, thereby bit-streaming (76). When bit-streaming a text data to be embedded in the certificate, addition of a parity bit in the even number or odd number form to 7 bits shows embedding and when embedding, ASCII even code Table or ASCII odd code Table is referred to. Method 2 constitutes a bit stream of 800 bits per 100 English characters. (See International Standard ASCII even code Table and ASCII odd code Table)

Method 3, considering the feature that a part of codes in Table 1 are not used, reduces number of codes being used as shown in Table 2 to express 6 bits and bit-stream (77) as a unit of 6 bits. Method 3 constitutes a bit stream of 600 bits per 100 English characters.

TABLE 2

| CHAR | INDEX | CHAR | INDEX | CHAR | INDEX | CHAR | INDEX |
|---|---|---|---|---|---|---|---|
| a | 0 | q | 16 | 6 | 32 | ` | 48 |
| b | 1 | r | 17 | 7 | 33 | - | 49 |
| c | 2 | s | 18 | 8 | 34 | . | 50 |

TABLE 2-continued

| CHAR | INDEX | CHAR | INDEX | CHAR | INDEX | CHAR | INDEX |
|---|---|---|---|---|---|---|---|
| d | 3 | t | 19 | 9 | 35 | / | 51 |
| e | 4 | u | 20 | SP | 36 | : | 52 |
| f | 5 | v | 21 | ! | 37 | ; | 53 |
| g | 6 | w | 22 | " | 38 | < | 54 |
| h | 7 | x | 23 | # | 39 | = | 55 |
| i | 8 | y | 24 | $ | 40 | > | 56 |
| j | 9 | z | 25 | % | 41 | ? | 57 |
| k | 10 | 0 | 26 | & | 42 | @ | 58 |
| l | 11 | 1 | 27 | ' | 43 | [ | 59 |
| m | 12 | 2 | 28 | ( | 44 | \ | 60 |
| n | 13 | 3 | 29 | | 45 | ^ | 61 |
| o | 14 | 4 | 30 | * | 46 | { | 62 |
| p | 15 | 5 | 31 | + | 47 | | 63 |

Hence, in case of the same bit stream, Method 3 can embed more text documents than other methods can do, while not embedding the same text as text constituting the certificate. However, Methods 1 and 2 can embed the same document as text of the certificate. In other words, reduction in codes of Method 3 makes it impossible to express the information showing a character shape of the text constituting the certificate. It means it is impossible to express a style of character as it is.

FIG. 5 illustrates a process of bit-streaming a text to be embedded based on the classification of FIG. 3. A process of bit streaming a text based on Korean, Chinese, and Japanese other than English is explained herein. The text data (82) to be embedded winch is generated in the embedding text generating portion 2(a)(80) and the embedding text generating portion 2(b)(81) in FIG. 3 is not prepared in English and thus 2 byte code based on other Unicode. Therefore, a type of language of the certificate is classified to bit-stream the text data to be embedded in the certificate.

The certificates prepared in language other than English, i.e., those based on 2 byte code of Korean, Chinese, and Japanese, etc. are all bit-streamed (83) as a unit of 16 bits. Regarding the Universal Code System distributed in May, 1993, ISO 10646-1/Unicode 1.1, since Unicode and ISO 10646 were integrated, technically speaking, ISO 10646 is "almost" similar to Unicode version 1.1. UCS-2 of ISO 10646-1 and Unicode are united into one. At present Unicode 2.0, a revised edition of ISO 10646, has solved a partial problem existing in the version 1.1. ISO 10646/unicode is now commonly used. The Universal Code System supports Korean, Chinese, and Japanese, etc. in the form of a 16 bit code. Based on such International Standard, the present invention, when bit streaming the digital certificate, bit-streamed the digital certificate in Korean, Chinese, and Japanese, etc. as a unit of 16 bits. (See International Standard ISO 10646-1 UCS 2 & ISO 10646 Unicode 2.0/3.0 Code Table)

Hence, when bit-streaming a certificate in English and a certificate in language other than English, the length of the bit stream is differentiated. In other words, in case of an English certificate, amount of the text capable of being embedded in the certificate is twice as much as that of the Unicode-based certificate in other language other than English.

Figure 6:
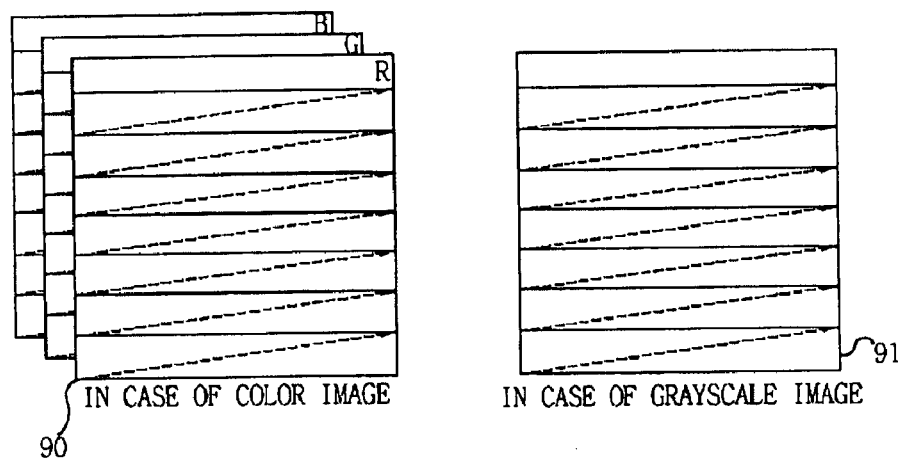
FIG. 6 illustrates the process of changing an image included in the digital certificate to the one dimensional data or, in case an image is not included in the certificate, changing the generated transparent image to the one dimensional data.

FIG. 6 illustrates a process of converting an image included in the digital certificate or, in case an image is not included in the certificate, the generated transparent image into one-dimensional data. There are various methods in converting an image into one-dimensional data. Raster Scan Image method among commonly used methods is applied to the present invention. Hilbert Scan Image method, Z Scan Image method, etc. also can be applied.

Raster Scan Image converts two-dimensional data into one-dimensional data, which is most simple and widely used method. Starting at the point of left above of an image, a lower line (next row) pixel value of the image, from the highest line (row) in turn is re-arranged in a one-dimensional manner and thus one-dimensional image signal is prepared. In case an image extracted from the certificate is a black-and-white color image 91, two-dimensional data is converted into one-dimensional data through a process of Raster Scan Image. In case an image extracted from the certificate is a color image 90, the image is decomposed to red, green, and blue components and is converted into one-dimensional data through a process of Raster Scan Image and then combined in order of red, green, and blue components to be converted into one-dimensional data.

Figure 7:
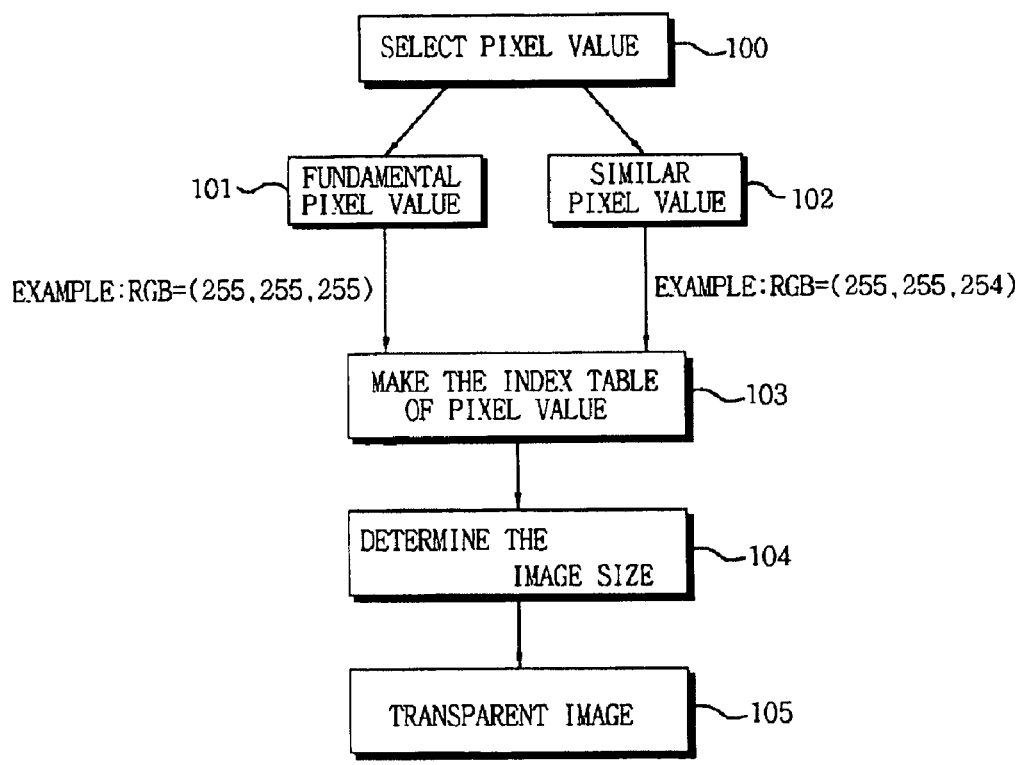
FIG. 7 illustrates the process of generating a transparent image.

FIG. 7 illustrates a process of generating a transparent image. A transparent image is manufactured in case where the background condition of the digital certificate to be issued is white. In case where the background condition is not white, a transparent image is generated based on the color information of background condition. The process of generating a transparent image is as follows: A transparent image generated for indicating accurate information of bit stream must be quantized to at least 2 bits. When the image is quantized to 2 bits, it comprises four pixel value (100). Each pixel value is given as 0, 1, 2, 3 and 0 corresponds to pixel value RGB=[255,255,255] (101) and 1 corresponds to pixel value RGB=[255,255,254] (102). A transparent image is generated using said 0 and 1. In selecting 0 and 1, there are methods of all selecting 0, all selecting 1, and selecting 0 and 1 at random (103). Size of a transparent image to be generated is determined (104) by size of text to be embedded. Number of pixels of a transparent image is at least bigger than length of a bit stream to be embedded in order to embed sufficient amount of text for authentication. And since the image is two-dimensional data, the size should be as large as a natural number multiplied by another natural number.

Figure 8A:
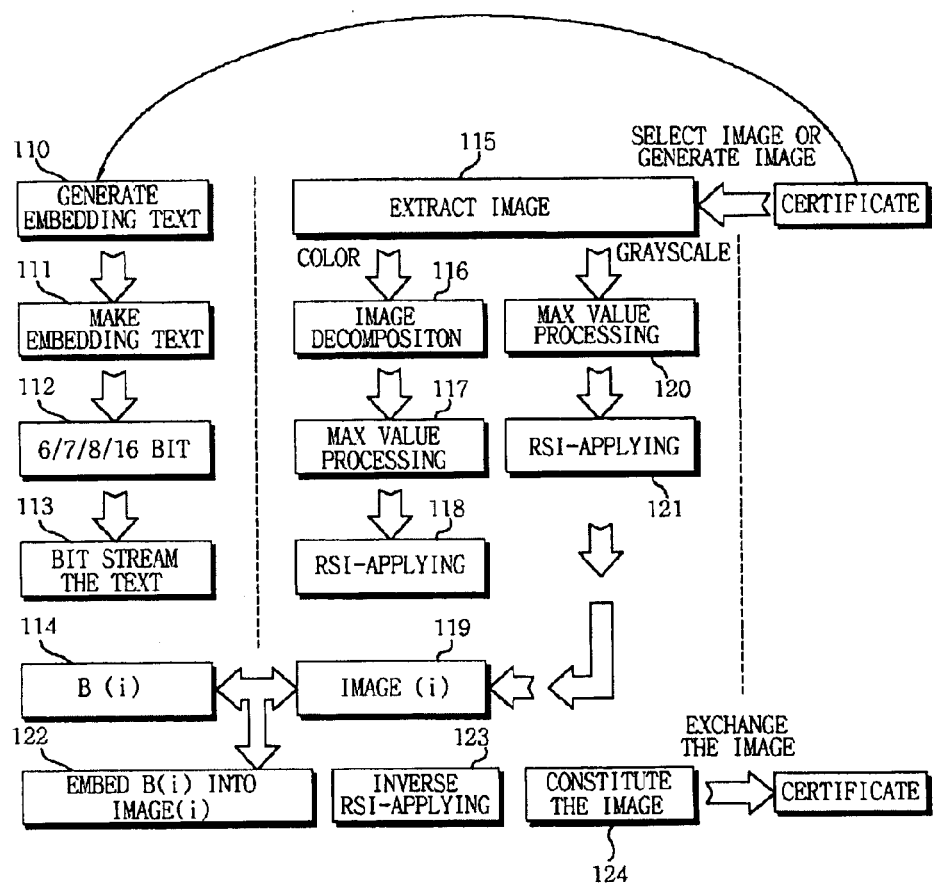
FIG. 8A illustrates the process of embedding a text data.

FIG. 8A illustrates a process of embedding text data. Step of embedding the bit-streamed data is as follows: First, in case an image included in the certificate is a grayscale, the maximum value Max(Pixel) of pixel value of image, is changed to Max(Pixel)−1 (120). In case an image extracted from the certificate is a color, the image is decomposed (116) by its color and the maximum value MAX(Pixel) of pixel value of red, green, and blue components is changed to Max(Pixel)−1 (117). This is such that the maximum value does not go beyond the range of 0~$2^m$−1 since pixel value changes in embedding an information text. In case the certificate does not include an image, a newly generated transparent image is employed as it is. Like in FIG. 4 or FIG. 5, text (110, 111) to be embedded is bit-streamed (112, 113) and like in FIG. 6, image data is given as one-dimensional data (118). The bit-streamed text data is indicated as B(i) (114). As a result of converting said image to one-dimensional data, the data is indicated as image(i) and the definition scope of one-dimensional data is classified as a color image and grayscale image, which are respectively indicated in Equation 1 and Equation 2. N×M shows size of width and length of a image.

$$0 \leq i \leq N \times M \quad (1)$$

$$0 \leq i \leq N \times M \times 3 \quad (2)$$

Equation 3 is a range of value of one-dimensional data. Herein m indicates a quantized bit number of the one-dimensional data. When the bit streamed data is embedded in said image data which is converted to one-dimensional data, $Key_{SN}$ indicates key value designating the first embedding location and image($Key_{SN}$+1) indicates a location virtually embedded in one-dimensional data.

$$0 \leq \text{image}(i) \leq 2^m - 1 \quad (3)$$

The principle of embedding (122) is as follows:

In case comparing the bit-streamed value with the embedding location value satisfies Equation 4, pixel value of an image, Equation 5, is not changed. If that fails to satisfy Equation 4, pixel value of one-dimensional image is changed by image($Key_{SN}$+i) +1.

$$\text{image}(key_{SN}+i) \equiv B(i) \bmod 2 \quad (4)$$

$$\text{image}(key_{SN}+i) \quad (5)$$

Figure 8B:
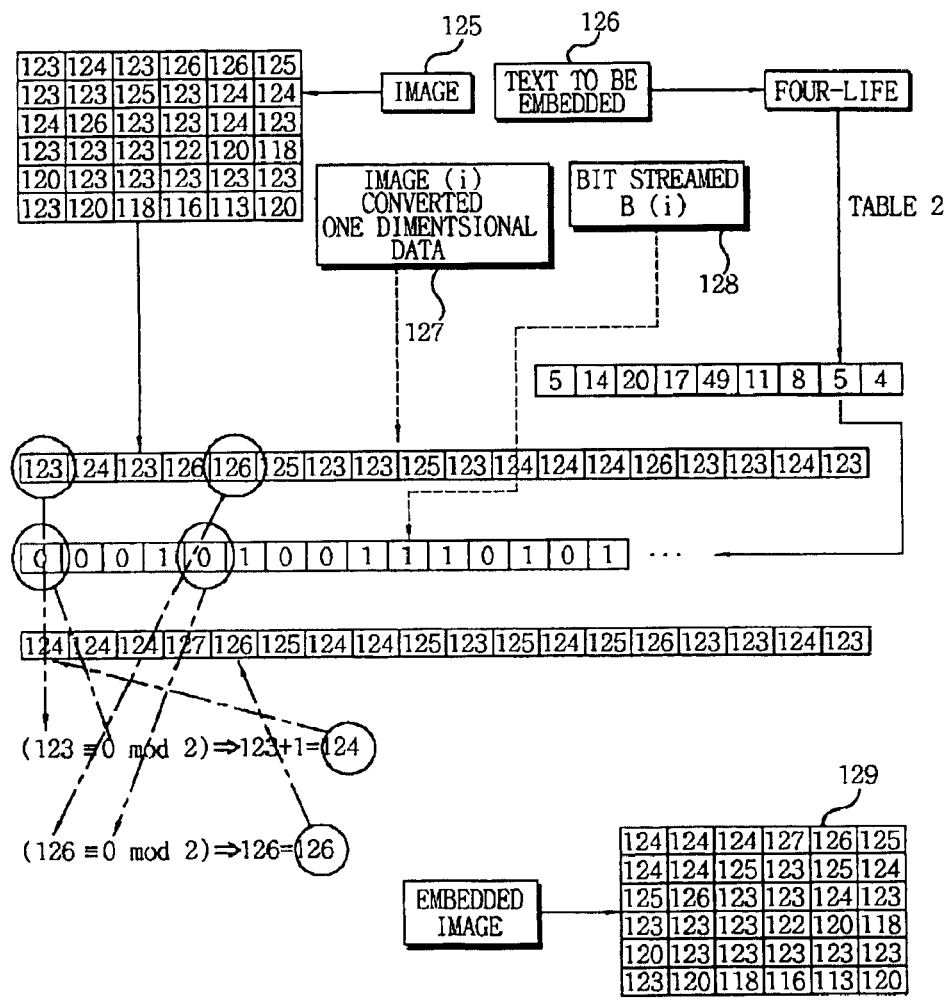
FIG. 8B illustrates an example of the process of embedding a text data.

For a specific example, as shown in FIG. 8B, a process of embedding the text "four-life" (126) in 6×6 pixel image (125), based on Method 3, is as follows (See Table 2): First, 6×6 image is changed to one-dimensional data Image (i) (127) by applying RSI method. Table 2 shows that "f" and "o" correspond to "5" and "14", respectively. Hence, a decimal number row "5, 14, 20, 17, 49, 11, 8, 5, 4" are obtained referring to "four-life" based on the index of Table 2. The above row is changed to a bit row in a unit of 6 bits and thus obtaining a bit-streamed data B(i). Since image (1)=123 and B(1)=0 based on Equation 4, pixel value is changed to 124 by applying 123+1. So to speak, since the first pixel value of one-dimensional image is 123, if 123 is divided by 2, the remnant is 1. Since the remnant 1 is not identical to the first bit value 0 of the bit stream, it makes 124 by adding 1 to the original value of the first pixel. Meanwhile, since when the second pixel Image(2)=124 is divided by 2, the remnant is identical to 0, the second bit value of a bit stream, the pixel value is not changed. The bit stream information of all B(i) is embedded in 6×6 image in the same way. The image is constituted (124) by applying an inverse RSI method (123) after embedding. Such constituted image is an image (129) in which a text is embedded.

A key is designated by a decimal number of 1~8 figures arbitrarily decided by a certificate holder or certificate issuer. Naturally the key is not used as it is. The range (D in the following Equation 6) designated by the key value through a mathematical calculation by the following Equations 6, 7, and 8 is prepared. A certificate issuer does not care about the process of being changed to the range designated by the key value. That is all that he memorizes information of the first designated key. The key employed in the present invention are under two restrictions as described below.

The first restriction is as follows:

A key is in a close contact with the number of pixels of the image extracted from the certificate, i.e., the size of image, and is affected by the size of image. The size of image is the range of bit stream generated in the text capable of being virtually embedded. Herein the maximum value of the definition i of image(i) is Max(image,i).

The second restriction is as follows:

The length of bit stream to be embedded is decided according to how much the maximum value of i in the B(i) is. Herein the maximum value of B(i) is Max (B,i). The range of the value of key $Key_{SN}$ is D. The value of D has the following relation with the maximum value Max(B,i) and the maximum value Max(image,i) of the bit stream obtained from the size of image and capable of being embedded.

$$D=\{\forall key_{SN}|0 \leq key_{SN} \leq Max(image,i)-Max(B,i)\} \quad (6)$$

If the inputted value of $Key_{SN}$ is bigger than the value indicated in Equation 7, the key value is used after the same calculation as Equation 8. If the inputted value of $Key_{SN}$ is smaller than the value indicated in Equation 7, the key value is used as it is. If virtually used key value is $Key_{SN1}$, the value is the same as Equation 8.

$$Max(image,i)-Max(B,i) \quad (7)$$

$$key_{SN1}=Key_{SN} \bmod Max(image,i)-Max(B,i) \quad (8)$$

The key is used for the following purposes.

First, the key is used for designating the location of embedding data of the bit streamed text document into one dimensional image data.

Second, the key is used for a certificate issuer and holder confirming that it is his own information. Such is to prevent the following attack. When a person forges a text document using the key value, it can prevent a document embedded in the image of the certificate using this algorithm from being confirmed.

Third, since the embedding section is decided using the key value, maintenance of security of the key value ensures stability of the embedded text data itself.

As shown in the embedding algorithm, an image is selected or generated based on the certificate and information text (of necessary information/content of entire certificate, etc.) to be embedded is generated based on the certificate. Text information prepared by the certificate is embedded into image selected in the certificate, a new image indistinguishable visually is prepared. Completion of embedding a text through such a process enables to authenticate the certificate.

Figure 9:
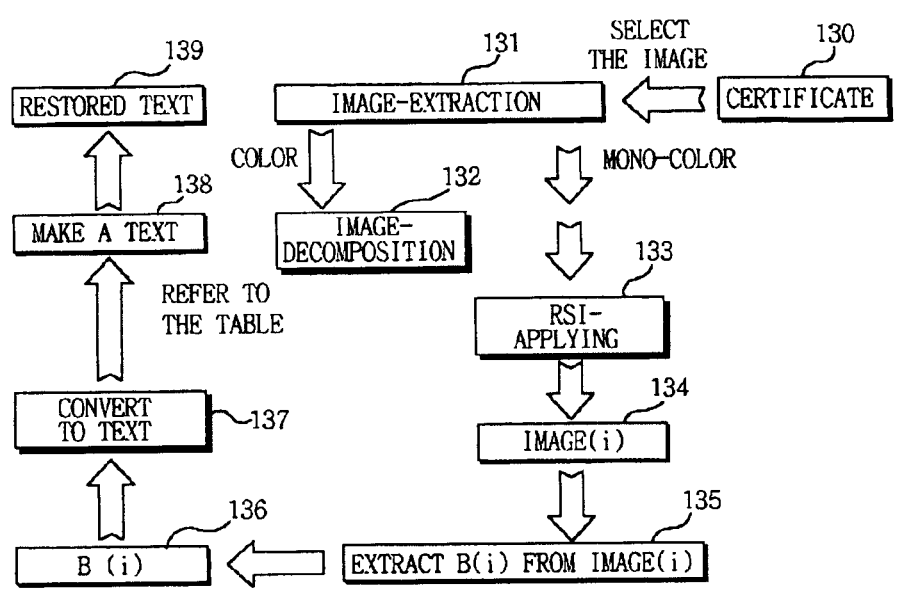
FIG. 9 illustrates the process of extracting a text data.
Figure 10:
FIG. 10 illustrates examples of an image data included in the certificate.

FIG. 9 illustrates a process of extracting text data. The extraction algorithm is proceeded as follows. First, an image (including a transparent image) into which an information text is embedded is selected (131) from an image such as a registered image of an individual or issuer, an evidencing picture of a user, or a logo and image of an issuing authority which are included in the certificate (130). The selected image is converted (134) into one dimensional data using Raster Scan Image method (133). Next, a location where embedding begins is found by a key of a user or issuer and a bit stream B(i)(135) satisfying image($key_{SN}$+1)=B(i) mod 2 based on whether the pixel value starting from one dimensional data image($KEY_{SN}$+1) is odd number or even number. Subsequently, in case of an English-based certificate, the embedding method 1, embedding method 2, and embedding method 3 are selected to combine with a unit of 8 bits, 7 bits, and 6 bits, respectively, and thus the above constituted bit stream (136) is changed (137) to a decimal number. In case of not an English-based certificate, the above constituted bit stream is changed to a decimal number after combining with a unit of 16 bits. And, the constituted decimal number stream is converted (138) to text data based on Table referred to by the embedding method. The result obtained by conversion becomes text data (139) to be restored.

As shown in FIG. 9, a process of restoring the embedded text is an inverse process of the embedding process.

A specific algorithm of the present invention comprises three basic steps. They are steps of generating an information text to be embedded, embedding an information text, and extracting an information text. What directly influences the performance of algorithm is the change in an image in a process of embedding an information text and amount of information to be embedded in a text. An explanation on this matter in more detail is as follows. First change in an image is explained.

It could be said that a process of embedding a text document is a process of virtually changing an image. In other words, an image is changed by embedding a text designated by a user into the image, which could be a process of embedding noise in an image. Size of the embedded noise divides the original image and text-embedded image. In the present invention, the certificate which is issued as a certificate of authentication and provided to a person who requests for an issue does not contain the image which was included in the originally generated certificate. In other words, an image embedded in the issued certificate is an image into which an information text generated by an issuer is embedded. The original image is not necessary any longer after embedding an information text.

The inventors experimentally verified that since the change in the pixel value is little, it undistinguishable visually. Change in the pixel value was proceeded only in the embedded region.

After embedding a text in a grayscale image, color image and registered image and comparing the image with the original image, it was found that it is impossible to confirm the change in the pixel value visually.

Next, amount of information to be embedded is reviewed.

Amount of information embedded as a series of texts is in a direct relation with the size of image included in the certificate and the level of quantization of the image. Table as shown below is a result of calculating amount of embedding a text according to the bit number of quantization and size of the image. As seen in the amount of the embedded information, in case the certificate includes an image, the content is hardly restricted. Usually the certificate contains the text content of about 500~3000 characters. Hence, size of the information text to be embedded is hardly restricted.

TABLE 3

| Image Size | Bit Number of Quantization | Information Amount Capable of being Embedded |
| --- | --- | --- |
| 256 by 256 | Color (24 bits) | Max 32,768 characters (unit of 6 bits) |
| 256 by 256 | Grayscale (8 bits) | Max 10,922 characters (unit of 6 bits) |
| 153 by 134 | Color (24 bits) | Max 10,251 characters (unit of 6 bits) |
| 153 by 134 | Grayscale (8 bits) | Max 3,417 characters (unit of 6 bits) |

If so, when a third party launches various attacks (modification, etc.) and makes a processing on the image which performed the method suggested in the present invention, it is explained what effect is produced.

There are many kinds in image processing. The present invention has made a variety of image processing regarding the text embedded image experimentally. In case the compression of the text embedded image proceeds in the same frequency space as JPEG, the embedded text disappeared. In case of applying a similar method of filter, the embedded text can not be restored. For a different image processing method, Histogram equalization, Image sharpening, Image cropping are applied. As a result, the embedded text document can not be still restored. Almost image processing method can not extract the embedded text except for a geometric image processing including rotation.

Table 4 as shown below is an analysis result of the image processing. (X—Extraction Impossible, O—Extraction Possible)

TABLE 4

| Processing Method | Image | | |
| --- | --- | --- | --- |
| | Color Image | Grayscale Image | Registered Seal Image |
| JPEG Compression | X | X | X |
| Image Cropping | X | X | X |
| Equalization | X | X | X |
| Sharpening | X | X | X |
| Smoothing | X | X | X |
| (Feature Extraction, Differential) Filtering | X | X | X |
| Geometric Rotation Change | O | O | O |

That is, the method suggested in the present invention has property of a Fragile Watermark indispensable for the purpose of "authentication". (Refer to a patent filed in the name of the present applicant regarding Fragile Watermark)

Alternation of the certificate includes alternation of text (name or data, etc.) which is the content of the certificate and alternation of image which is included in the certificate. In the event of altering the text content included in the certificate, extraction of the certificate content information text embedded into an image makes it possible to find the alternation and restore the original text document. According to the above result, since all the text content included in the certificate can be embedded into the image of the certificate, if extraction of the embedded text can restore all the content of the original certificate, it can be confirmed whether it is forged or altered. In the event of altering the text embedded image which is included in the certificate, the embedded text will not be extracted. When it is impossible to extract the text which is embedded in the above image, the certificate is regarded as being invalid.

Forgery of the certificate is to change a part of the certificate in the manner as one wishes. In the event of forging the certificate, it is necessary to find out the key used by a certificate issuer or user. If not so, it is possible to embed a text into the above image but its authentication is impossible. Thus, the forgery can be detected.

Figure 11:
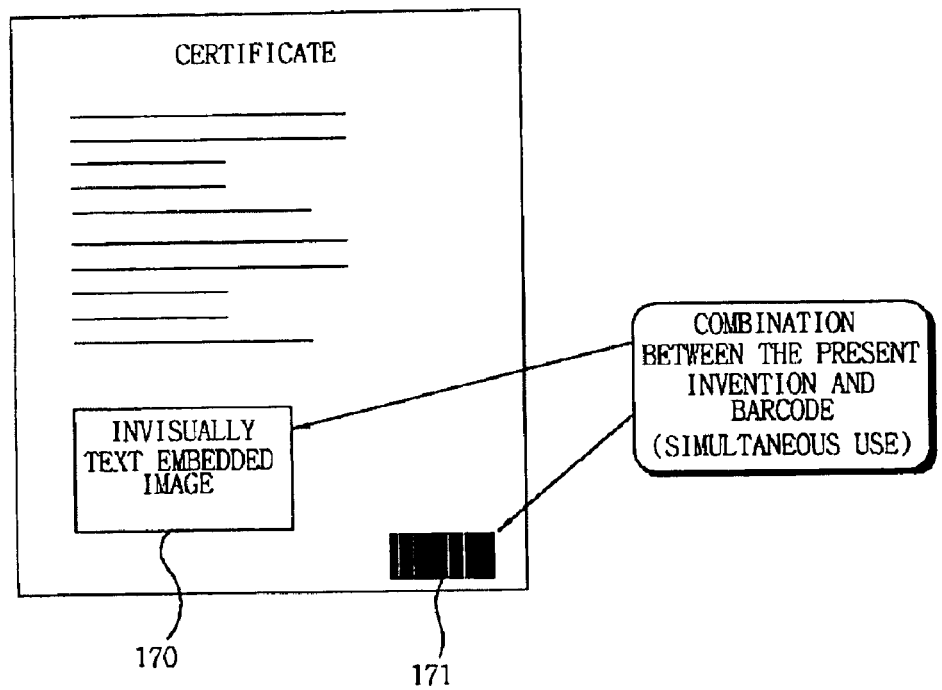
FIG. 11 illustrates an example of the certificate including a bar code image.

As seen in FIG. 11, it is possible to use a combination of bar code and text embedding method described above according to other embodiment of the present invention. This is a method of adding bar code to the image which is embedded into the certificate. More specifically, it is a method of adding bar code 171 to the image type which is included in the certificate at present and applying the present invention. This type of method is divided into two cases: one image is applied by combining bar code and other image; and bar code and image into which a text is embedded are separately applied.

In case of applying one image by means of a combination, the image part overlapping bar code is made a block processing and thus not embedding a text, making possible to maintain the stability of bar code and text. In case of a separate use, bar code makes authentication of the certificate easy and fast. Also, advantageously more performance of a process of the present invention to extract text which is embedded into the image is a double authentication, making it possible to intensify security and stability. In particular, in case of using bar code, when a person who tries to forge or alter the certificate simply sees bar code and attacks the part, the part of image 170 into which a text is embedded invisibly may be neglected, which has an effect of a double security.

Although it is not illustrated, the text embedding and extraction described above are performed using a computer.

A usual programming language reads the digital certificate for its object, i.e., an electronic document, and distinguishes text and image and prepares a program wherein a text is embedded into image and then stores it in a recording medium, thereby making it performed in a computer. A person having ordinary skill in the art can easily develop a variety of programs realizing the present invention. In other words, as widely known, the program-related data can be temporarily stored in a hard disc of computer from an exterior memory medium such as a floppy disc and can be stored in RAM from disc when the above text embedding program is operated. A memory medium for providing a program code, e.g., floppy disc, hard disc, optical disc, optic-magnetic disc, CD-ROM, CR-R, magnetic tape, non-volatile memory card, ROM, etc. are employed. When the present invention is applied to aforementioned memory medium, program codes corresponding to aforementioned embedding steps are stored in memory medium.

INDUSTRIAL APPLICABILITY

The present invention is sure to authenticate various types of digital certificate. Prevention of forgery or alternation of the certificate has an effect of avoiding a variety of damage caused by forgery or alternation. The present invention can distinguish the certificate from being forged/altered and restore the forged/altered content when forged/altered. Furthermore, the present invention can safely deliver the signature of a certificate issuer to the receiver and confirm the accurate identity of the other party by extracting the content of a text.

What is claimed is:

1. A method for embedding text into electronic document, comprising:

converting at least a part of said text to bit stream;

converting at least a part of image data to one dimensional data in case where said electronic document contains said image data, and generating transparent image data to convert the generated transparent image data to one dimensional data in case where said electronic document does not contain said image data;

embedding the text which was converted to bit stream into said one dimensional data;

restoring said one dimensional data embedded with said text to image data of said electronic document; and embedding the restored image data into said electronic document.

2. The method of claim 1, wherein said text is the information which is used for authenticating said electronic document.

3. The method of claim 1, wherein said transparent image is at least a part of background of said electronic document.

4. The method of claim 1, wherein said text is at least a part of said electronic document selected from said electronic document.

5. The method of claim 4, further comprising:

distinguishing the kinds of language of said text; and converting said text which will be embedded to said bit stream corresponding to each language.

6. The method of claim 1, wherein said embedding further comprises:

calculating the remnant of each unit data of said one dimensional data using a remnant operator; and maintaining said unit data in case where the remnant is equal to one bit value of said bit stream, and adding 1 to said unit data in case where the remnant is not equal to one bit value of said bit stream, said remnant being compared with said one bit value of said bit stream.

7. The method of claim 1, wherein at least a part of said text is converted to said bit stream after block encoding it or calculating message digest value of it is performed.

8. The method of claim 1, wherein said converting uses one technique among the Raster Scan Image, Hubert Scan Image, and Z Scan Image.

9. The method of claim 1, wherein at least apart of said image data includes barcode.

10. A method for extracting text from the electronic document into which the text was embedded according to claim 1, comprising:

selecting the text embedded image data from said electronic document;

converting at least a part of the selected image data to one dimensional data; generating said series of bit stream in accordance with said one dimensional data; and extracting the embedded text by converting said series of bit stream to text.

11. The method of claim 10, wherein said generating said series of bit stream in accordance with said one dimensional data comprises:

calculating the remnant by dividing each unit data of said first order by 2; and generating said series of bit stream from said remnant.

12. A computer-readable recording medium for storing computer program for authenticating electronic document, the program allowing a computer to execute the steps of:

converting at least a part of text to a bit stream;

converting at least a part of image data to one dimensional data in case where said electronic document contains image data, and generating transparent image data to convert said transparent image data to one dimensional data in case where said electronic document does not contain image data;

embedding said text which was converted to said bit stream into said one dimensional data;

restoring said one dimensional data into which the is embedded to image data of said electronic document; and inserting the restored image data into, said electronic document.

* * * * *